United States Patent [19]

Boy

[11] Patent Number: 4,739,439

[45] Date of Patent: Apr. 19, 1988

[54] OVERVOLTAGE ARRESTER

[75] Inventor: Juergen Boy, Berlin, Fed. Rep. of Germany

[73] Assignee: Siemens Aktiengesellschaft, Berlin and Munich, Fed. Rep. of Germany

[21] Appl. No.: 38,662

[22] Filed: Apr. 15, 1987

[30] Foreign Application Priority Data

Apr. 22, 1986 [DE] Fed. Rep. of Germany ....... 3613599

[51] Int. Cl.[4] ........................................ H02H 9/06

[52] U.S. Cl. .............................. 361/120; 361/117; 313/602; 313/609

[58] Field of Search ............... 313/325, 601, 602, 609; 361/117, 118, 120

[56] References Cited

U.S. PATENT DOCUMENTS

| | | | |
|---|---|---|---|
| 2,431,226 | 11/1947 | Berkey et al. | 313/309 |
| 3,317,777 | 5/1967 | Algar et al. | 313/602 |
| 3,702,952 | 11/1972 | Cassidy et al. | 361/120 |
| 4,345,293 | 8/1982 | Hasse et al. | 361/117 |
| 4,491,893 | 1/1985 | Toda | 361/120 |
| 4,493,006 | 1/1985 | Lange et al. | 313/325 |

FOREIGN PATENT DOCUMENTS

| | | |
|---|---|---|
| 0138082 | 4/1985 | European Pat. Off. . |
| 3207663 | 9/1983 | Fed. Rep. of Germany . |
| 544264 | 4/1942 | United Kingdom . |

*Primary Examiner*—M. H. Paschall

*Assistant Examiner*—Jeffrey A. Gaffin

*Attorney, Agent, or Firm*—Hill, Van Santen, Steadman & Simpson

[57] ABSTRACT

An overvoltage arrester for handling high surge currents including a pair of electrodes one of which includes a blind bore into which the second electrode projects, thereby providing at least one discharge gap between the two electrodes. The arrester of the present invention has a long useful life and a high surge current carrying capability.

10 Claims, 2 Drawing Sheets

OVERVOLTAGE ARRESTER

BACKGROUND OF THE INVENTION

1. Field of the Invention

The present invention is directed to a gas tube type surge protective device using two interfitting electrodes.

2. Description of the Prior Art

A gas tube surge protective device containing two electrodes secured to a cylindrical insulator to provide a vacuum tight enclosure has been described in U.S. Pat. No. 3,702,952. The disclosure of that patent is incorporated herein by reference. The overvoltage arrester disclosed in that patent consists of a first electrode which forms a cylindrical gap with a ceramic housing, together with a circular, wafer-shaped gap and a cylindrical gap in a low deposition space. A starting electrode is produced by sputtering electrode material onto the inside wall of the ceramic housing. The sputtered metal extends into the condensation gap. This type of starting aid requires high static initial ignition values after extended dark storage. Moreover, the effect of the starting aid is deteriorated with current passage, particularly during a surge current load since the metal of the electrodes thereby vaporizes and the expulsion of gases contained therein may raise the ignition voltage.

The gaps used in the low deposition rear spaces of the prior art must be extremely narrow. They should comprise a gap width of about 0.025 mm. This short spacing is required with the design of the prior art in order to prevent a short circuit as a consequence of metal precipitation along the surface of the ceramic housing despite the extremely short gap lengths. In the example given, the gap may have a length of about 1.1 mm overall. Said extremely small gap widths require very precise structuring of the individual parts and an extremely precise assembly. In practice, the ceramic material must also be provided with an inside burnishing which is involved and expensive.

SUMMARY OF THE INVENTION

The present invention is directed to an improved arrester which is more easily manufactured than devices of the prior art. In addition, the arrester of the present invention provides a reduction of the scatter of values obtained and in the reduction of the disturbing "light-dark effect" i.e., the sporadically occuring, high static initial ignition values following a longer duration between two discharges.

In accordance with the present invention, there is provided an overvoltage arrester including a hollow cylindrical insulator, a pair of electrodes hard soldered to the insulator and providing a vacuum-tight space in the interior of the insulator, with a starting aid secured only to one of the electrodes. The starting aid extends into the low deposition space provided between one of the electrodes and the insulator. The electrode includes a bore into which the other electrode projects, the electrodes being shaped to provide a discharge gap between them. With the structure of the present invention, with identical outside dimensions and at least equivalent arresting capability, there are far lower demands as far as mechanical tolerances are concerned in order to guarantee a reduced range of scatter of the electrical data. The shaping and the type of starting devices also interact to provide a more efficient unit. The structure is such that it can be soldered together in simple adjustment devices.

The end face of one of the electrodes is preferably covered with a metal coating which serves as an activator. By using such an activator, the arc discharge can be concentrated on the discharge gap between the parts of the electrodes which are covered with the activator or can at least be kept in the discharge gap.

A high glow ignition voltage is required for various applications. Activators having alkali and alkaline earth compounds of known composition are unsuitable for this purpose because they provide too low a glow ignition voltage or they may produce a gas contamination following the surge current load due to subsequent generation of gas as they produce a chemical conversion of the activator causing an instability of the electrical characteristics. Pure metals used as activators are more stable toward load but tend to atomize and with multiple alternating current loads, they produce a considerable metal condensation on the housing parts which are visible from the discharge gap.

Metals can be used as activators in accordance with the present invention since with the design of the arrester, a high degree of metal vapor condensation is achieved at non-critical locations, for example, at the second electrode and an adequately large space is available for the metal vapor. The critical insulator segments are not subject to vapor deposition to any great extent, so a low deposition space can be provided in a relatively simple way. A particularly advantageous activator for a high glow ignition voltage consists of a first component in the form a fused-on layer of aluminum and a second component which consists of a metal which forms a eutectic with the aluminum and has a melting point lying below the soldering temperature. The metals Ag, Cu, Si, Sn, and Cr are particularly suitable as the second component when they are present in metallic form. A silver layer can also be used as an activator in an overvoltage arrester of the present invention. The silver can be applied in powder form or by means of known coating methods such as by electrodeposition.

The metals which are added to the aluminum as the second component prevent a roughening of the electrode surface which arises during soldering and during operation when aluminum alone is utilized as an activator. This roughening considerably changes the characteristics and can lead to a short circuit. Based upon my observation, the roughening is caused by a ball formation of the aluminum layer as a consequence of heating and can be prevented by the use of the aformentioned additives. The aluminum metal advantageously acts as a getter at the same time.

A high performance, space saving embodiment is provided by an insulator housing composed of ceramics and electrodes composed essentially of copper. At least the second electrode is soldered to the ceramic housing with a eutectic silver-copper solder. A silver containing metal layer is applied to both electrodes in the region of the discharge gap to act as an activator layer. The condensation gap has a width which is at least roughly the same as the width of the discharge gap. The low deposition rear space is about 1.5 times as wide as the discharge gap. The length of the condensation gap and of the gap-shaped low deposition rear space amounts to at least 5 times the corresponding gap width. The end face of the cylinder wall of the first electrode is preferably rounded off. The spacing of the end face of the cylinder wall from all parts of the second electrode amounts to about 1.5 times the width of the discharge gap. This dimensioning produces no discharges outside of the discharge gap. It therefore provides a extremely space saving overvoltage arrester. Starting strips composed of graphite are also advantageously used as a starting aid for a uniform ignition voltage.

In a preferred form of the invention, the shortest path from the starting aid along the ceramic housing to the first electrode is at least as great as the smallest spacing between the two electrodes in the region of the discharge gap.

The activator layer preferably contains aluminum in an amount between 10 and 40% by weight. A firmly adhering layer is thus obtained without the formation of small aluminum balls.

An embodiment of the invention having a low unit scatter of the electrical characteristics is provided by utilizing an inside diameter for the insulator housing of about 1 mm larger than the outside diameter of the first electrode. The inside diameter of the insulating housing and the outside diameter of the first electrode do not depart by more than plus or minus 0.1 mm from their respective nominal values.

The overvoltage arrester of the present invention is preferably filled with a gas mixture of argon and hydrogen containing an amount of hydrogen between 5 and 20%.

BRIEF DESCRIPTION OF THE DRAWINGS

The three figures of the drawings are cross sectional views of different forms of overvoltage arresters.

DESCRIPTION OF THE PREFERRED EMBODIMENTS

Figure 1:
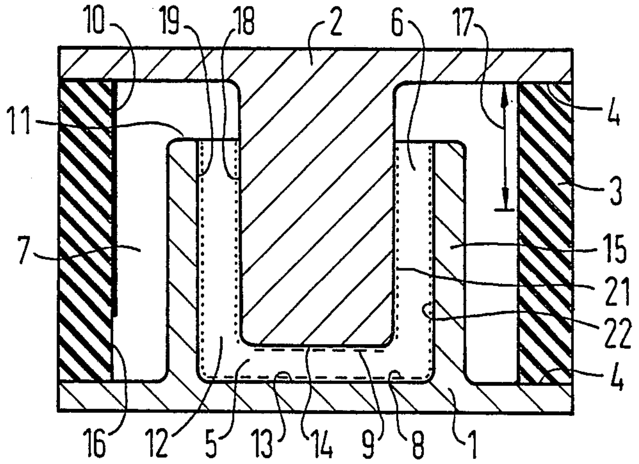

In FIG. 1, there is shown combination of a first electrode 1 located within a cylindrical ceramic housing 3, in combination with a second electrode 2. The elements are soldered to one another in a vacuum-tight condition by means of solder surfaces 4. The first electrode 1 comprises a blind ended bore 12 including a cylindrical inside wall 19 and a floor 13. The second electrode 2 comprises an end face 14 and a generated surface 18.

A gap 5 extends between the end face 14 and the floor 13. The gap 5 between the inside wall 19 of the first electrode 1 and the generated surface 18 of the second electrode 2 merges into a gap 6 which has at least the same width as the gap 5. The two electrodes 1 and 2 are preferably of copper but they may also be composed of an alloy, for example, of the metals Fe, Ni and Co.

The end face 11 of the cylinder wall 15 is rounded off or bevelled. The spacing of the end face 11 from arbitrary parts of the second electrode 2 amounts to at least about 1.5 times the width of the smaller of the two gaps 5 or 6.

A low deposition rear space 7 extends between the cylinder wall 15 and the ceramic housing 3. Its legnth amounts to about 5 times its width. At least one starting strip 10 is connected to the electrode 2 in conductive fashion and extends into the low deposition rear space 7. The distance of the lower extremity of the strip 10 from the first electrode 1 along the inside wall 16 of the ceramic housing 3 is at least about the same as the spacing of the two electrodes 1 and 2 from each other in the gaps 5 or 6. The starting strip or strips 10 are preferably made from graphite.

A considerable reduction in the dimensions of the overvoltage arrester can be accomplished by providing an activator layer 8,9,21,22 to at least one limiting surface of the gaps 5 or 6. As a result thereof, the discharge is kept in the region of the activator layer. The overvoltage arrester can be miniaturized both in diameter as well as in axial extent without discharges occuring at undersired locations, which discharges would potentially reduce the useful life of the overvoltage arrester.

In FIG. 1, both the inside wall 19 of the first electrode 1 and the generated surface 18 of the second electrode 2 as well as the floor 13 of the first electrode 1 and the end face 14 of the second electrode 2 are covered with activator layers 8,9,21 and 22. As a result thereof, the gaps 5 and 6 are completely utilized as discharge gaps. The overvoltage arrester can thus accomodate an extremely large surge current load.

Figure 2:
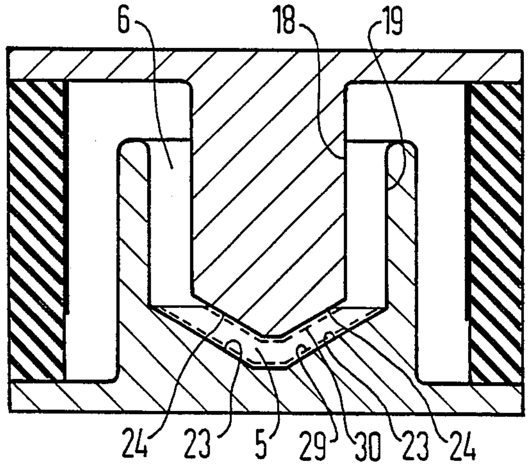

FIG. 2 shows an embodiment which is particularly simple to manufacture. In this form, the end face 24 and the floor 23 are each shaped approximately conically and the angle of the cone jacket to its rotational axis corresponds to the angle of the cutter of a spiral drill to its rotational axis. In the example, the activator layers 29 and 30 are provided only on the end face 24 and on the floor 23. The gap 5 is narrower than the gap 6. The dimensions of the overvoltage arrester in the axial direction can thus be kept relatively small.

Figure 3:
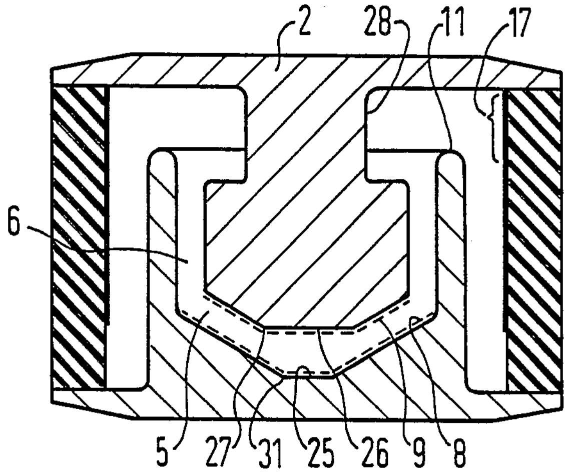

The device of FIG. 3 has a particularly long useful life. In this form of the invention, activator layers 8 and 9 are applied in the region of the gap 5 whereas no activator layers are present in the vicinity of the gap 6. As a result, the gap 6 essentially acts as an additional condensation gap. In order to avoid mis-ignitions in the region of the end faces 11, the second electrode 2 includes a region 28 having a reduced diameter in proximity to the end face 11, so that the distance between the end face 11 and the second electrode 2 also meets the insulating demands.

The end faces 14 and the floor 13 are in the shape of truncated cones terminating in circular areas 25 or 26 at the side having the smaller cross section. The circular areas 25 and 26 have different diameters so that their edges 27 and 31 are offset relative to each other in the radial direction. The circular area 25 is smaller than the circular area 26. As a result, a current concentration along the edge 27 is avoided. In this embodiment, the gap 6 is narrower than the gap 5 so that the diameter of the arrester can be kept relatively small and the metal evaporating in the gap 5 can precipitate quickly in the relatively narrow gap 6. The region 17 on the ceramic insulator which is vapor-deposited with metal is thereby kept quite small. This embodiment thus guarantees an especially long useful life for the overvoltage arrester.

It should be evident that various modifications can be made to the described embodiments without departing from the scope of the present invention.

I claim as my invention:

1. An overvoltage arrester comprising:

a hollow cylindrical insulator, a pair of electrodes secured to said insulator and providing a vacuum-tight space in the interior of said insulator, one of said electrode extending into said insulator and providing a low deposition space to said insulator, a starting aid secured only to the other of said electrodes and electrically connected thereto, said starting aid extending into said low deposition space, said one electrode including a bore into which said other electrode projects, and said electrodes being shaped to provide a discharge gap between them.

2. An overvoltage arrester according to claim 1 in which at least one of said electrodes is covered with a metallic activator layer at said discharge gap.

3. An overvoltage arrester according to claim 2 wherein the electrodes are secured to said insulator by hard soldering and wherein said activator layer is a fused on layer of aluminum and a metal spread therein which forms an eutectic with aluminum and which has a melting point below the soldering temperature.

4. An overvoltage arrester according to claim 2 wherein said activator layer is composed of silver.

5. An overvoltage arrester according to claim 3 wherein said metal is Ag, Cu, Si, Sn, or Cr.

6. An overvoltage arrester according to claim 3 wherein said activator contains from about 10% to about 40% by weight aluminum.

7. An overvoltage arrester according to claim 1 which includes at least one graphite starting strip as a starting aid.

8. An overvoltage arrester according to claim 1 wherein the shortest path from said starting aid along said insulator is at least as long as the smallest spacing between said electrodes in the region of said discharge gap.

9. An overvoltage arrester according to claim 1 wherein the inside diameter of said insulator is about 1 mm greater than the outside diameter of said one electrode.

10. An overvoltage arrester according to claim 1 wherein the interior of said arrester contains a mixture of argon and hydrogen containing between 5 and 20% hydrogen.

* * * * *